UNITED STATES PATENT OFFICE

2,513,747
CYCLIC AMINO-ACETALS

Richard Sallmann, Gelterkinden, and Charles Graenacher, Riehen, Switzerland, assignors to Ciba Limited, Basel, Switzerland, a firm No Drawing. Application September 10, 1946, Serial No. 696,052. In Switzerland October 4, 1945

8 Claims. (Cl. 260—338)

According to this invention amino-compounds of acetal-like cyclic ethers or amino-compounds of the polyhydric alcohols corresponding to the said cyclic ethers are made by treating an acetal-like cyclic ether of a halogen-alcohol containing at least 2 hydroxyl groups at a raised temperature with ammonia or a primary or secondary amine, the reaction temperature being at least 110° C. when a chlorinated acetal is used as starting material, and, if desired, splitting off the carbonyl-compound bound in the manner of an acetal by treatment with an acid to form the salt of a poly-oxy-amine.

The result obtained by this process is unexpected, because the chlorine atom in the acetal-like cyclic ethers of polyhydric chlorinated alcohols is very strongly bound; thus it is known that ($\gamma$-chloropropylene)-isopropylidene dioxide (acetone-glycerine-$\alpha$-chlorhydrin) when heated for 4 hours at 100° C. with potassium hydroxide remains unchanged. Therefore, it could not be foreseen that the present process would lead to the desired result.

The acetal-like cyclic ethers used as starting materials may be derived, on the one hand, from halogen-alcohols containing at least 2 hydroxyl groups, such as glycerine-$\alpha$-monochlorhydrin, glycerine-$\alpha$-monobromhydrin, glycerine-$\alpha$-mono-iodohydrin, glycerine $\beta$-monochlorhydrin, chloro-butylene glycol, 4-chloro-butanetriol-(1:2:3), pentaerythritol monochlorhydrin, mannitan bromhydrin, dulcitan chlorhydrin, and, on the other, from carbonyl-compounds, that is to say aldehydes (such as formaldehyde, acetaldehyde, butyraldehyde or benzaldehyde) or ketones (such as acetone, methyl ethyl ketone or diethyl ketone). As examples of such acetal-like cyclic ethers of halogen-alcohols there may be mentioned:—

($\gamma$-chloropropylene)-methylene dioxide, also named formaldehyde-($\gamma$-propylene)-acetal or formaldehyde-$\alpha$-monochlorhydrin; ($\gamma$-chloropropylene)-ethylidene dioxide, also named acetaldehyde-($\gamma$-chloropropylene)-acetal; ($\gamma$-chloropropylene)-benzylidene dioxide, also named benzaldehyde-glycerine-$\alpha$-monochlorhydrin; ($\gamma$-chloropropylene)-isobutylidene dioxide; ($\beta$-chloropropylene)-iso-propylidene dioxide, also named acetone-glycerine-$\beta$-chlorhydrin; and also propylene-chloropropylidene dioxide, formed from trimethylene glycol and acrolein by additive combination with hydrogen chloride. The acetal-like cyclic ethers serving as starting materials, in so far as they have not already been described in the literature, can be made without difficulty by methods analogous to those used for making the known compounds.

As primary amines there may be used those of the aliphatic series, such as methylamine, ethylamine, amylamine or dodecylamine, and also the products obtainable by the reaction of ammonia with the halogen-acetals to be used in the process. Among the secondary amines there may be mentioned, those of the aliphatic series such as dimethylamine, diethylamine, diamylamine or didodecylamine, and also those of the heterocyclic series such as piperidine.

The reaction temperature to be maintained during the reaction of the halogen-compounds in accordance with the invention depends on the reactivity of the halogen atoms. Iodo- and bromo-compounds react at a relatively low temperature, whereas chloro-compounds require a reaction temperature exceeding 110° C., for example, 130–140° C. An excess of ammonia or of the primary or secondary amine is generally of advantage. Easily volatile reaction components, such as ammonia, dimethylamine or piperidine, are advantageously caused to react in a pressure vessel. Ammonia is advantageously caused to react in the absence of a solvent.

The optional splitting off of the carbonyl compound bound in the manner of an acetal from the amino-acetals obtained by the process may be brought about by heating with a strong acid, for example, hydrochloric acid, in presence of water.

The cyclic amino-acetals obtainable from ammonia by the invention are generally mixtures of primary and secondary amines. For example, there are formed from cyclic acetals of glycerine-$\alpha$-chlorhydrin by reaction with ammonia, mixtures which consist mainly of a product of the formula

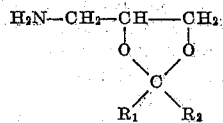

and a product of the formula

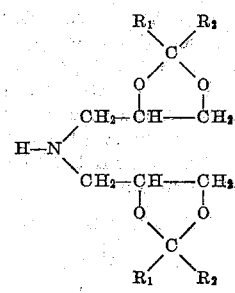

In the above formulae, $R_1$ and $R_2$ each represent hydrogen or a hydrocarbon residue.

From primary amines there are generally obtained by the present process mixtures of secondary and tertiary amines. Tertiary amines obtainable according to the present invention may be transformed into quaternary ammonium compounds by treating them with alkylating or aralkylating agents, such as dialkyl sulfates, alkylhalides or aralkyl halides, for instance with dimethyl sulfate, methyliodide or benzyl chloride.

The cyclic amino-acetals and also the corresponding polyoxy-amines derived therefrom are generally liquids having a pronounced basic character, and can be used as intermediate products for making textile assistants, agents for combating pests or pharmaceutical preparations. They may be used, for example, for making amine soaps. Quaternary ammonium salts may be used as disinfecting agents.

Secondary amines of the invention may be designated as amines of the general formula

wherein R is a member selected from the group consisting of alkyl radicals containing at least 2 hydroxy groups and alkyl radicals containing at least two hydroxy groups etherified with a carbonyl compound to form a cyclic acetal, which amines have a pronounced basic character and, in the form of their hydrochlorides, are soluble in water.

The following examples illustrate the invention, the parts being by weight unless otherwise stated, and the relationship of parts by weight to parts by volume being the same as that of the kilogram to the litre:

Example 1

200 parts of (γ-chloropropylene)-isopropylidene dioxide (acetone-glycerine-α-chlorhydrin) are heated in a directly heated rotary autoclave of V2A-steel with 300 parts of liquid ammonia for 8 hours at 130–140° C. A pressure of about 110 atmospheres develops. After blowing out the excess of ammonia, the reaction mass is dissolved in 300 parts of water. Unchanged starting material can no longer be detected in the aqueous solution. 120 parts of solid caustic soda are added in portions, whereupon the mixture of bases separates in the form of an oil. By fractional distillation under reduced pressure the crude product can be separated into two components. The first boils at 65–66° C. under 14 mm. pressure and the second at 147–148° C. under 14 mm. pressure. They are both colorless liquids which are miscible in all proportions with organic solvents. Both amines dissolve easily in cold water. However, only the lower boiling base is easily soluble in hot water. Their aqueous solutions have a strongly alkaline reaction. There are obtained under the conditions described above, as an average of various tests, about one-third of the higher boiling base and two-thirds of the lower boiling base. This ratio can be varied to a considerable extent by changing the quantity of ammonia.

Investigation has shown that the lower boiling amine has the formula

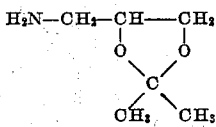

and is to be designated as (γ-aminopropylene)-isopropylidene dioxide. This amine boils at 168° C. under 745 mm. pressure.

The higher boiling amine corresponds to the formula

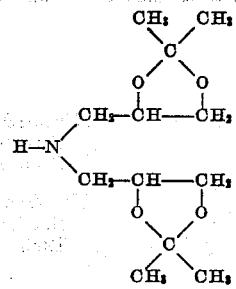

Both amines split off acetone when boiled with an excess of hydrochloric acid and yield the hydrochloride of the corresponding polyoxy-amine.

Instead of acetone-glycerine-γ-chlorhydrin, cyclic acetals of other halogen alcohols, for instance, acetone-glycerine-β-chlorhydrin or acetone-4-chloro-butanetriol-(1:2:3) may be used, whereby mixtures of the corresponding primary and secondary amino acetals are obtained. The cyclic acetal, used as starting material, may also be derived from other ketones, for instance from cyclohexanone.

Example 2

A mixture of 30 parts of (γ-chloropropylene)-isopropylidene dioxide and 30 parts of diethylamine are heated in a pressure vessel for 12 hours at 130–140° C. The reaction product is mixed with 40 parts of concentrated caustic soda solution, and the oil which rises to the surface is separated. Since there is present in the oil a small quantity of unchanged starting material which can only be removed with difficulty by distillation, the base is dissolved in a small quantity of water, and acidified with sulfuric acid, while cooling thoroughly. The water-insoluble starting material can be extracted with ether. The solution, which is now clear, can be mixed with caustic soda in order to separate the base, and the latter is distilled after being dried with caustic soda. It boils at 84–86° C. under 14 mm. pressure. The base of the formula

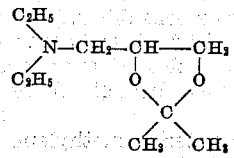

is sparingly soluble in water and easily soluble in organic solvents.

Example 3

A solution of 30 parts of (γ-chloropropylene)-isopropylidene dioxide (acetone-glycerine-α-chlorhydrin) in 70 parts by volume of an alcoholic solution of dimethylamine of 25 per cent strength is heated for 15 hours at 130–140° C. After removing the alcohol by distillation under reduced pressure at 40–50° C., a concentrated solution of caustic soda is added to the reaction product, and the oil which separated is isolated. After being dried with caustic soda, the product is distilled under reduced pressure. It boils at 63° C. under 12 mm. pressure. The base of the formula

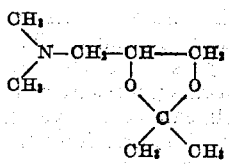

has a strongly alkaline reaction, and is soluble in water as well as in organic solvents.

*Example 4*

30 parts of (γ-chloropropylene)-isopropylidene dioxide (acetone-glycerine-α-chlorhydrin) are heated in a pressure vessel for 12 hours at 130–140° C. with 34 parts of piperidine. A concentrated solution of caustic soda is then added, and the oil which separates is isolated. After being dried, it is distilled under reduced pressure. It boils at 111–112° C. under 14 mm. pressure. The base of the formula

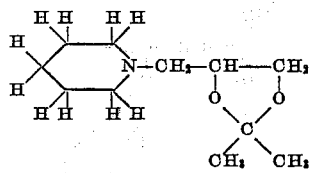

is sparingly soluble in water and easily soluble in all organic solvents.

*Example 5*

145 parts of (γ-chloropropylene)-methylene dioxide (formal-glycerine-α-chlorhydrin) are heated in a rotary autoclave of V2A-steel with 250 parts of liquid ammonia for 8 hours at 130–140° C. The reaction product is dissolved in 300 parts of water, and the base is thrown out of solution by the addition of 120 parts of solid caustic soda while cooling. After being separated and dried with solid caustic soda, the product is divided into two fractions by distillation under reduced pressure. The first fraction boils at 63° C. under 12 mm. pressure and 164° C. under 742 mm. pressure, and corresponds to the primary base. The (γ-aminopropylene)-methylene dioxide so obtained is a colorless oil, which dissolves in water and in organic solvents. Aqueous solutions thereof, when acidified with HCl, evolve formaldehyde upon being heated.

The second fraction boils at 152–154° C. under 14 mm. pressure. It is a viscous colorless oil, which is miscible in all proportions with water and organic solvents. Its aqueous solutions have an alkaline reaction. The new amine has the formula

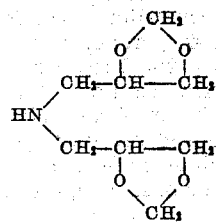

*Example 6*

26.2 parts of formal-glycerine-α-chlorhydrin are heated with 70 parts of an alcoholic solution of dimethylamine of 27.3 per cent. strength in a pressure vessel for 15 hours at 130–140° C. At the end of that period a test portion of the reaction mixture is completely soluble in water. The alcohol is removed from the reaction mixture by distillation with the aid of a fractionating column, and then the residue, containing the hydrochloride of the base, is dissolved in a small quantity of water, and mixed with solid caustic soda while cooling until the base separates in the form of an oil. The latter is isolated, and the last traces of residual base retained in the caustic soda liquor are extracted with ether. After being dried with solid caustic soda, the base is distilled. The (γ-dimethyl-aminopropylene)-methylene dioxide of the formula

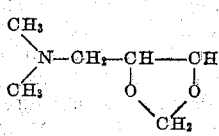

has a boiling point of 57° C. under 12 mm. pressure and of 159–160° C. at atmospheric pressure, and is a colorless oil soluble in all proportions in water and in organic solvents.

*Example 7*

26.2 parts of formal-glycerine-α-chlorhydrin and 30 parts of diethylamine are heated in a pressure vessel for 12 hours at 130–140° C. The resulting base mixture, which is intermingled with the hydrochloride of the base, is stirred with 40 parts of concentrated caustic soda solution, and the oil which separates is isolated. After being dried with solid caustic soda the oil is distilled, advantageously with the aid of a fractionating column. A small quantity of a mixture of the new base with unchanged starting material passes over initially, and then the pure base, (γ-diethylaminopropylene)-methylene dioxide, distils at 79–80° C. under 12 mm. pressure. The base is a colorless oil, which is easily soluble in water in organic solvents.

*Example 8*

24.5 parts of formal-glycerine-α-chlorhydrin are heated in a pressure vessel with 34 parts of piperidine for 12 hours at 130–140° C. The reaction product is worked up in the manner described in Example 6. The resulting (piperidine-N-γ-propylene)-methylene dioxide of the formula

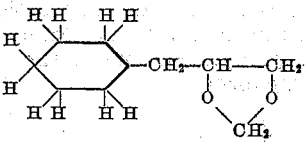

is a colorless base, which boils at 109–111° C. under 12 mm. pressure, has an odour faintly resembling that of piperidine, and dissolves easily in water and in organic solvents.

*Example 9*

180 parts of (γ-chloropropylene)-ethylidene dioxide are heated with 150 parts of liquid ammonia in a high pressure steel autoclave for 8 hours at 130–140° C. After the excess of ammonia has been blown out, the residue containing ammonium chloride and the hydrochlorides of the bases is dissolved in 250 parts of water, and mixed while cooling with 80 parts of solid caustic soda. The layer containing the bases, which separates, is isolated, dried with caustic soda, and fractionated with the aid of a fractionating column. At 62–63° C. under 14 mm. pressure (γ- aminopropylene)-ethylidine dioxide of the formula

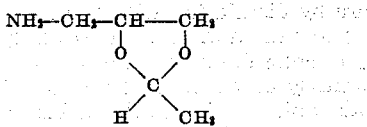

distils in the form of a colorless oil having a weakly basic odour, which boils at 164–165° C. under atmospheric pressure, and which dissolves easily in water and in organic solvents. Its aqueous solutions have a strongly alkaline reaction and, after acidification with a strong acid, liberate acetaldehyde when heated.

In fractionating the mixture of bases obtained as described above a second base passes over at 145–147° C. under 14 mm. pressure. This base is also easily soluble in water and in organic solvents, and corresponds to imino-di-(γ-propylene-ethylidene dioxide) of the following formula:

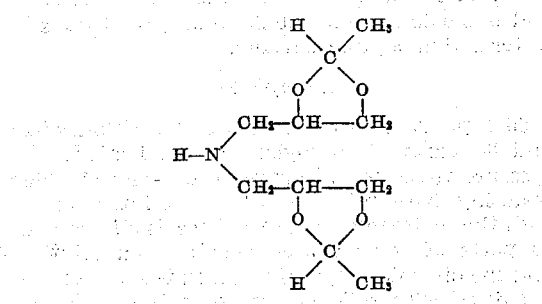

*Example 10*

27 parts of (γ-chloropropylene)-ethylidene dioxide are heated in a pressure vessel with 34 parts of piperidine for 12 hours at 130–140° C. The reaction product is worked up in the manner described in Example 6. γ-piperidino-propylene-ethylidene dioxide is obtained in the form of a colorless base, which distils at 106–107° C. under 14 mm. pressure. It is sparingly soluble in cold water and easily soluble in organic solvents.

*Example 11*

32.8 parts of (γ-chloropropylene)- isobutylidene dioxide (prepared from glycerine-α-chlorhydrin and methylethyl ketone) are heated in a pressure vessel with 34 parts of piperidine for 12 hours at 130–140° C., and the reaction product is worked up as described in Example 6. The γ-piperidino-propylene-isobutylidene dioxide so obtained of the formula

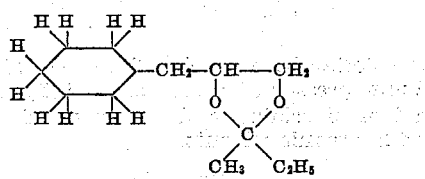

has a boiling point of 128° C. under 12 mm. pressure and is a colorless base, which is sparingly soluble in cold water and easily soluble in organic solvents. Aqueous solutions of the base become turbid upon heating. Methyl-ethyl-ketone is split off when the cyclic acetal is heated with hydrochloric acid.

*Example 12*

30 parts of (γ-aminopropylene)-isopropylidene dioxide are heated with 15 parts of γ-chloropropylene isopropylidene dioxide for 12 hours at 130–140° C. with the exclusion of air. The initially clear reaction mixture gradually solidifies in a partially crystalline condition. The reaction product is worked up as described in Example 6. The lower boiling fraction distilling at 50–68° C. under 144 mm. pressure during the fractionation of the base contains a mixture of the two starting materials which can be recovered therefrom in known manner. The fraction boiling at 144–150° C. under 14 mm. pressure contains imino-di-(γ-propylene-isopropylidene dioxide), and its properties correspond to those of the higher boiling amine of Example 1 (last formula of Example 1).

*Example 13*

19.8 parts of γ-chloropropylene-benzylidene dioxide (prepared from glycerine-α-chlorhydrin and benzaldehyde) are heated with a solution of 30 percent. strength of dimethylamine in methyl alcohol for 12 hours at 130–140° C. The methyl alcohol is then removed by distillation, and γ-dimethylamino-propylene-benzylidene dioxide of the formula

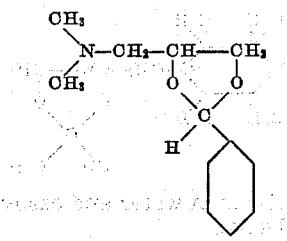

can be recovered from the residue by a usual method in the form of a yellowish oily base, which boils at 97–102° C. under 0.01 mm. pressure. The product is sparingly soluble in water, but easily soluble in dilute aqueous acids, which latter cause rapid splitting upon heating with the separation of benzaldehyde.

*Example 14*

30 parts of acetone-glycerine-α-chlorhydrin are heated in a pressure vessel with 68 parts of an alcoholic solution of ammonia of 10 per cent. strength and 4.3 parts of sodium carbonate of 12 hours at 130–140° C. The alcohol is removed from the reaction solution by distillation, and then the residue is worked as described in Example 1 to recover the base. In this manner a mixture of primary and secondary bases is obtained, which mixture, when subjected to fractional distillation, yields the same products as those obtained in Example 1.

*Example 15*

27.5 parts of (γ-chloropropylene)-ethylidene dioxide are heated with 30 parts of diethylamine in a pressure vessel for 15 hours at 130–140° C. The partially crystalline reaction product is mixed first with 40 parts of water and then with caustic soda until the base has completely separated in the form of an oil. After isolating the product and drying it with caustic soda, it is distilled under reduced pressure. At first a small quantity of unchanged starting material passes over, and then the base of the formula

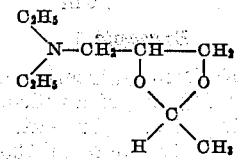

distils at 87–89° C. under 14 mm. pressure. It is a liquid having a weakly basic odour, and is sparingly soluble in water and easily soluble in organic solvents.

*Example 16*

30 parts of (γ-aminopropylene)-isopropylidene dioxide are dissolved in 100 parts of distilled water. After the addition of 20 parts by volume of hydrochloric acid of 37 per cent. strength, the clear solution is heated for one hour on the water bath. Acetone is evolved, and initially colorless solution becomes slightly red-brown. The excess of acid is then neutralized with sodium carbonate, and the hydrochloride of γ-aminopropylene glycol is decomposed by the addition of 9.5 parts of caustic soda. After being dried by evaporation under reduced pressure, the liberated amine is isolated by extraction with absolute alcohol, and the alcohol is removed by distillation. The residue, which is a thickly fluid oil, may be distilled under reduced pressure, 3-aminopropanediol-(1:2) passes over at 152° C. under 12 mm. pressure.

*Example 17*

50 parts of the base of the formula

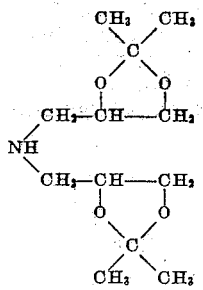

are dissolved in 200 parts by volume of sulfuric acid of 10 per cent. strength. The solution is gradually heated to the boil in the course of 30 minutes whereupon the originally strong acetone odour disappears. After the addition of barium carbonate until there is no more acid reaction there follows filtration. The filtrate is evaporated under reduced pressure; the base is obtained in the form of a thick, brownish colored oil which solidifies into a soft amorphous mass. The base is easily soluble in water or alcohol, but insoluble in ether. Its aqueous solution shows a strongly alkaline reaction.

*Example 18*

2.0 parts of the base of the formula

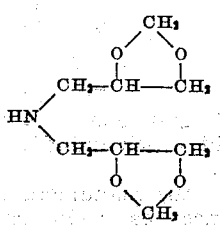

are mixed with 1.6 parts of methyl iodide and allowed to stand for several hours at room temperature. When the reaction, which is accompanied by the evolution of heat, is about to subside, the mass is slightly heated in order to complete the reaction. By dissolving in a small quantity of methyl alcohol and precipitating with ether the product is obtained in pure state. The new quaternary salt is an unctuous, yellowish mass which dissolves in water to give a clear solution.

*Example 19*

3.6 parts of the base of the formula

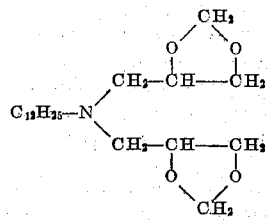

are mixed with 1.4 parts of dimethyl sulfate. After the mixtue has been allowed to stand for one hour at room temperature it is heated on the steam bath for 10 minutes in order to complete the reaction. A colorless crystalline mass is obtained which dissolves in water to give a clear solution.

*Example 20*

25 parts of the cyclic condensation product from camphor and glycerine-α-chlorohydrine of the formula

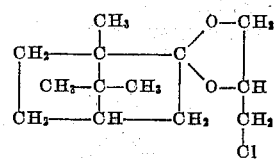

which is easily obtainable by a process of analogy (by splitting off water in the presence of an auxiliary solvent which makes an azeotropic mixture with water) are heated to 130–140° C. in an autoclave for 12 hours with 40 parts of a methyl alcoholic dimethylamine solution of 30 per cent. strength. After distilling off the methyl alcohol and the excess dimethyl amine, the residue is stirred with concentrated caustic soda solution. The oil which separated is removed, diluted with ether, dried with caustic soda and, after the removal of the ether, distilled. It is a colorless oil which boils at 100–102° C. (0.02 mm.). It is soluble in dilute acids. Its mineral acid solutions split off camphor when heated.

7.3 parts of the base so obtained, dissolved in 15 parts by volume of absolute alcohol, are mixed with 4.8 parts of methyl iodide. The solution solidifies within a few hours to make a crystalline mass. Alcohol is added in such quantity as is necessary for the mass to dissolve after boiling. The crystals which form upon cooling are filtered off and dried. A white crystal mass is thus obtained. The new quaternary ammonium salt is easily soluble in water. Its aqueous solution, when acidified and heated, soon separates camphor in crystalline form.

*Example 21*

5 parts of the cyclic acetal from thujone and glycerine-α-chlorohydrin of the formula

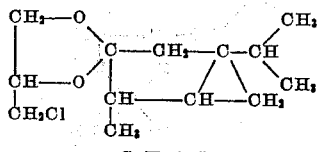

$C_{15}H_{25}O_3Cl$ (boiling point 81–83° C. [0.07 mm.]) which is easily obtainable by a process of analogy (by splitting off water in the presence of an auxiliary solvent which makes an azeotropic mixture with water) are heated in an autoclave with 13 grams of alcoholic dimethyl amine solution of 17.1 per cent. strength, first for five hours to 120–130° C. and then for 10 hours to 130–140° C. After distilling off the alcohol the residue is dissolved in 60 parts of water and the solution is carefully acidified with dilute hydrochloric acid while cooling with ice. After extracting a small quantity of starting material with ether, the solution is rendered strongly alkaline with caustic soda solution, the separated oil taken up in ether and the ethereal solution dried with potash. After distilling off the ether an oil is obtained which distills at 94–96° C. (0.05 mm.).

1.3 parts of this oil are dissolved in 2 parts by volume of absolute alcohol. The solution is mixed with 0.8 part of methyl iodide while cooling with ice and allowed to stand over night at room temperature. The solution solidifies to form a mass of very small crystals which are obtained in pure state after washing with ether. They are soluble in water and when acidified and heated separate thujone.

What we claim is:

1. Process for the manufacture of an amine of the formula

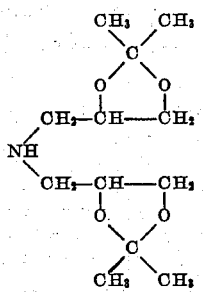

which comprises condensing the cyclic acetone ketal of glycerine-α-monochlorhydrin with ammonia under pressure at a temperature of at least 110° C. and isolating the amine boiling at 147–148° C. under 14 mm. pressure by fractional distillation from the reaction mixture.

2. An amine of the general formula

wherein R is a propyl radical containing two hydroxy groups etherified with a carbonyl compound to form a cyclic ether, which amine has a pronounced basic character.

3. The amine of the formula

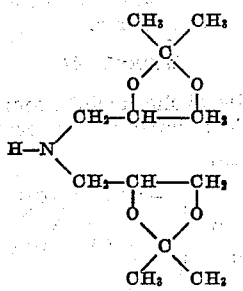

which amine is a colorless liquid, which boils at 147–148° C. under 14 mm. pressure, and is soluble in cold water.

4. The amine of the formula

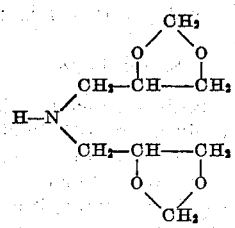

which amine is a colorless liquid, which boils at 152–154° C. under 14 mm. pressure, and is soluble in cold water.

5. An amine of the general formula

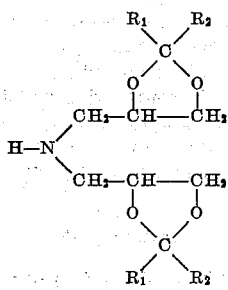

wherein each $R_1$ and each $R_2$ is a member selected from the group consisting of hydrogen and hydrocarbon radicals, which amine has a pronounced basic character.

6. An amine of the general formula

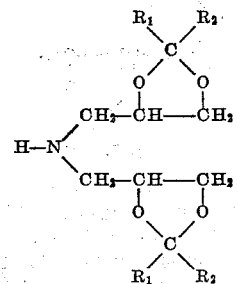

wherein each $R_1$ and each $R_2$ is a hydrocarbon radical, which amine has a pronounced basic character.

7. An amine of the general formula

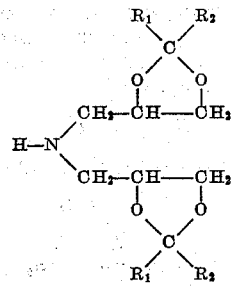

wherein each $R_1$ and each $R_2$ is an alkyl of low molecular weight, which amine has a pronounced basic character.

8. Process for the manufacture of an amine with a pronounced basic character and corresponding to the formula

wherein R is a propyl radical containing two hydroxy groups etherified with a carbonyl compound to form a cyclic ether, which process comprises heating a member selected from the group consisting of cyclic acetals of a glycerine-monochlorhydrin, cyclic acetals of a glycerine-monobromhydrin, cyclic ketals of a glycerine-monochlorhydrin and cyclic ketals of a glycerine-monobromhydrin with ammonia under pressure at a temperature of at least 110° C.

RICHARD SALLMANN.
CHARLES GRAENACHER.

REFERENCES CITED

The following references are of record in the file of this patent:

UNITED STATES PATENTS

| Number | Name | Date |
| --- | --- | --- |
| 2,091,704 | Duncan et al. | Aug. 31, 1937 |
| 2,377,105 | Reichstein | May 29, 1945 |
| 2,445,393 | Fourneau | July 20, 1948 |

OTHER REFERENCES

Sowden et al., J. Am. Chem. Soc. 64, pgs. 1291–1293 (1942).

Fourneau et al., Bull. Soc. Chim. (1945), pages 847 and 848.